G. H. PARKS.
DEMOUNTABLE RIM.
APPLICATION FILED MAY 25, 1915.

1,177,650.

Patented Apr. 4, 1916.

UNITED STATES PATENT OFFICE.

GEORGE H. PARKS, OF GRAND RAPIDS, MICHIGAN.

DEMOUNTABLE RIM.

1,177,650.  Specification of Letters Patent.  Patented Apr. 4, 1916.

Original application filed November 10, 1914, Serial No. 871,297. Divided and this application filed May 25, 1915. Serial No. 30,477.

*To all whom it may concern:*

Be it known that I, GEORGE H. PARKS, a citizen of the United States, residing at Grand Rapids, in the county of Kent and State of Michigan, have invented certain new and useful Improvements in Demountable Rims, of which the following is a specification.

This invention contemplates an improved demountable rim for vehicle wheels, being a division of my pending application filed November 10th, 1914, Serial No. 871,297.

The invention has as its primary object to provide a construction wherein the rim may be readily attached to or detached from the wheel, and wherein, in turn, a tire may be readily attached to or detached from the rim.

The invention has as a further object to provide a construction wherein but a single locking element will be employed for connecting the rim with the wheel, so that upon the release of said element, the rim may be readily removed. And a still further object of the invention is to provide a construction wherein but a single locking element will be employed for connecting the tire with the rim, so that the tire may be easily displaced.

Other and incidental objects will appear as the description proceeds and in the drawings wherein I have illustrated the preferred embodiment of the invention, and wherein similar reference characters designate corresponding parts throughout the several views. Figure 1 is a fragmentary perspective view partly broken away showing my improved rim in connection with the felly of a vehicle wheel, Fig. 2 is a similar view showing a portion of the rim detached with the parts thereof disassembled but in proper relative position, and Fig. 3 is a fragmentary sectional view more particularly showing the mounting of the rim.

Referring now more particularly to the drawings, I have conventionally shown a portion of the wheel felly at 10. Surrounding the felly is an annular metallic band 11 to which is secured by a plurality of circumferentially spaced rivets, a second annular band 12 forming the body portion of an inner rim. The body portion 12 upon one side thereof is provided with an annular upstanding flange 13 having an inner beveled face as more particularly shown in Fig. 3 of the drawings. Arranged to coöperate with the body portion 12 of the inner rim, is a sectional locking ring 14 between adjacent extremities of which is disposed a locking element or wedge 15 for urging the locking ring into engagement with the body portion 12 of the rim. The locking ring 14 as is also the element 15, is provided with an upstanding flange arranged to coöperate with the flange 13 and having an inner beveled face confronting the beveled face of the said flange. The element 15 is provided with a depending ear 16 arranged to seat flatly against one side face of the felly 10 and detachably connecting the said element with the felly is a bolt or other suitable fastening device 17 which extends through the said ear.

The structure of the inner rim above generally described forms the subject-matter of my pending application previously referred to and has been set forth herein in order that the mounting of the outer rim of the present invention may be more clear.

Coming now more particularly to describe the outer rim, I employ an annular metallic band 18, the outer face of which is cut away upon one side of the band, to provide an annular seat 19. Formed on the opposite side of the band is an annular upstanding flange 20. The band 18 is of a circumference to surround the inner rim and upon its inner face is provided with transversely spaced circumferentially extending annular shoulders 21 which are disposed to seat upon the inner rim as best shown in Fig. 3 of the drawings. The outer edges of the said shoulders are provided with beveled faces disposed for engagement with the beveled faces of the flange 16 and the flange of the ring 14. It will be seen, upon reference to Fig. 3, that the ring 14 is adapted to tightly clamp the shoulders 21 between itself and the flange 13 of the inner rim for rigidly supporting the outer rim upon the wheel.

Formed in the inner edge of the seat 19 upon one side of the rim, is a recess 22 which, at its extremities, provides longitudinally extending and oppositely arranged undercut shoulders 23. Upon each side of the recess 22, the seat 19 is provided with a plurality of circumferentially spaced recesses 24 which provide upon each side of the recess 22 a plurality of oppositely arranged undercut shoulders 25.

Detachably mounted within the seat 19 is a sectional ring 26 formed of semi-circular sections, each of which is provided with laterally projecting lugs 27 forming oppositely arranged shoulders 28, the shoulders of one of said sections being disposed for engagement with the shoulders 25 upon one side of the recess 22 while the shoulders of the other section are disposed for engagement with the shoulders upon the other side of said recess. It will be observed that the sections of the ring are provided with terminal lugs 29 adapted to be received within the recess 22 of the rim and are provided with shoulders adapted for engagement with the shoulders 23.

Formed on the ring 26 at one side thereof is an upstanding flange 30 disposed to confront the flange 20 and the adjacent extremities of the sections forming the said ring and disposed within the recess 22 are provided with oppositely inclined edges arranged for engagement with a wedge 31. The wedge 31, adjacent one extremity, is provided with an upstanding flange 32 adapted to form a continuation of the flange 30. Intermediate of its ends, the wedge 31 is provided with a suitable screw threaded opening adapted to detachably receive the screw threaded shank of a locking screw 33, the said screw being arranged to extend loosely through a suitable opening 34 formed in the rim and being preferably provided with a squared head adapted to receive a wrench or other tool. It will thus be noted that the wedge 31 may be readily removed by first removing the screw 33. Normally, the wedge will act to urge the sections of the ring 26 in opposite directions to cause the shoulders thereof to securely engage the shoulders of the rim. However, as will be seen, when the wedge 31 is displaced, the sections of the ring 26 may be moved upon the ring toward each other and easily displaced. In this connection, attention is called to the fact that but a single fastening element is employed in the form of the screw 33, for operatively maintaining the locking ring 26 in position. The band 18 of the rim is adapted to receive a tire conventionally illustrated at 35 in Fig. 3 of the drawings and is also adapted to receive the locking rings 36 therefor, which are respectively urged to abut the flanges 20 and 30 of the rim and locking ring. Thus, as will be observed, by removing the locking ring 26 in the manner heretofore indicated, the tire 35 may easily and readily be disconnected from the rim while the rim itself may also be demounted with equal facility.

What is claimed is:—

1. A wheel rim including a body portion adapted to receive a tire and having a plurality of recesses formed therein defining oppositely arranged shoulders, a sectional locking ring carried by the body portion and provided with oppositely arranged shoulders engaging said first mentioned shoulders, and a wedge engaging between adjacent extremities of said ring.

2. A wheel rim including a body portion adapted to receive a tire and having a plurality of recesses formed therein defining oppositely arranged shoulders, a sectional locking ring carried by the body portion, the said ring being provided with lugs extending within said recesses and having shoulders formed thereon engaging said first mentioned shoulders, and a wedge engaging between adjacent extremities of said ring.

3. A wheel rim including a body portion adapted to receive a tire and having a recess formed therein upon one side defining oppositely arranged shoulders, there being a plurality of circumferentially spaced recesses formed in the body portion defining oppositely arranged shoulders upon each side of said first mentioned recess, a sectional locking ring carried by the body portion and having laterally projecting lugs formed thereon extending within said recesses and provided with oppositely arranged shoulders engaging the oppositely arranged shoulders defined by the recesses upon each side of said first mentioned recess, the sections of the ring being each provided at one extremity with a terminal lug having a shoulder formed thereon, the said terminal lugs extending within the said first mentioned recess with the shoulders thereof engaging the said first mentioned oppositely arranged shoulders defined by the recess, and a wedge seated in said first mentioned recess and engaging between adjacent extremities of the ring.

4. A wheel rim adapted to receive a tire and including a body portion having a plurality of oppositely arranged and circumferentially extending shoulders formed thereon, a sectional locking ring carried by the body portion and provided with a plurality of oppositely arranged and circumferentially extending shoulders engaging said first mentioned shoulders, and a wedge engaging between adjacent extremities of said ring.

5. A wheel rim including a body portion adapted to receive a tire and provided upon each side of a diametric line therethrough with a plurality of circumferentially spaced shoulders, the shoulders upon one side of the said line being reversely arranged to the shoulders upon the other side of the line, a sectional locking ring having the sections thereof provided with oppositely arranged shoulders respectively engaging said first mentioned shoulders, and a locking member engaging between adjacent extremities of said ring.

6. A wheel rim including a body portion having an annular locking ring seat formed in one side thereof, one wall of said seat being cut away to provide oppositely disposed shoulders, a sectional locking ring having a plurality of laterally projecting lugs formed thereon and provided with oppositely disposed shoulders engaging said first mentioned shoulders, and a locking member engaging between adjacent extremities of the sections of said ring.

7. A wheel rim including a body portion provided with oppositely disposed shoulders, a sectional locking ring, each section of the said ring having laterally projecting lugs formed on one margin thereof and provided with shoulders, the shoulders of one section being reversely arranged to the shoulders of the other section with the said shoulders engaging the shoulders of the rim, and a locking member engaging between adjacent extremities of said sections.

In testimony whereof I affix my signature.

GEORGE H. PARKS. [L. S.]